Aug. 4, 1959

NICHOLAS CHRISTOFILOS
ALSO KNOWN AS
NICHOLAS PHILOS 2,898,456

UNIVERSAL, CONSTANT FREQUENCY, PARTICLE ACCELERATOR

Filed June 9, 1953

INVENTOR.
BY

Aug. 4, 1959  NICHOLAS CHRISTOFILOS  2,898,456
ALSO KNOWN AS
NICHOLAS PHILOS
UNIVERSAL, CONSTANT FREQUENCY, PARTICLE ACCELERATOR
Filed June 9, 1953  4 Sheets-Sheet 2
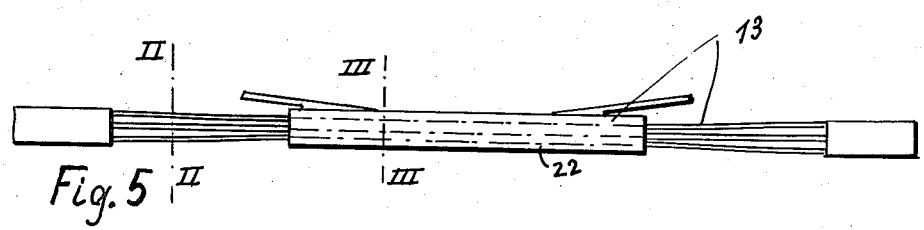
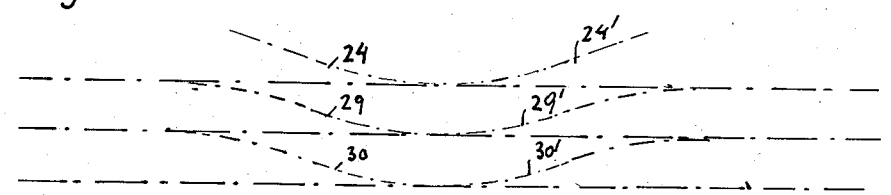
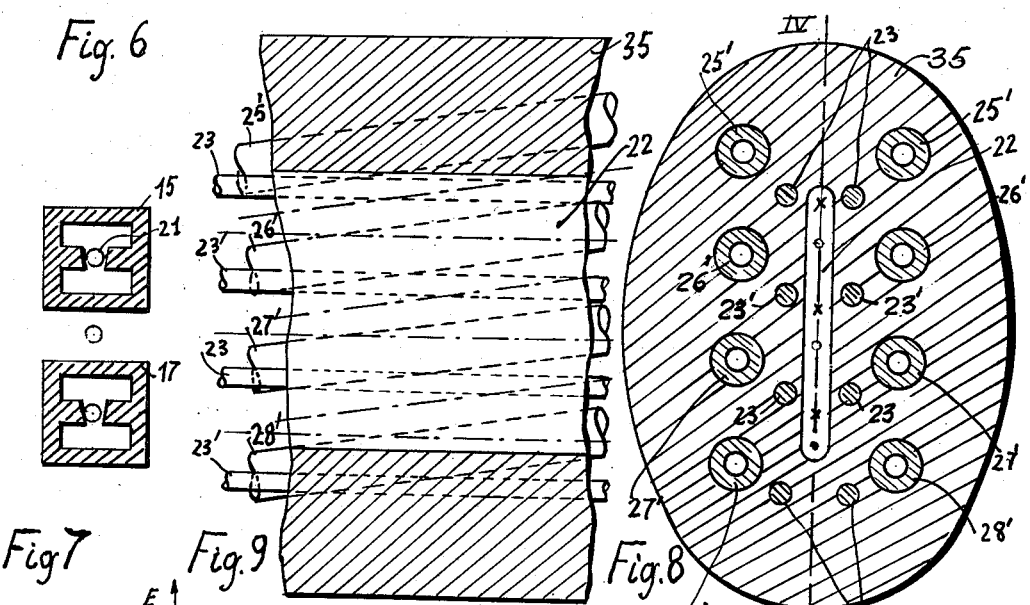
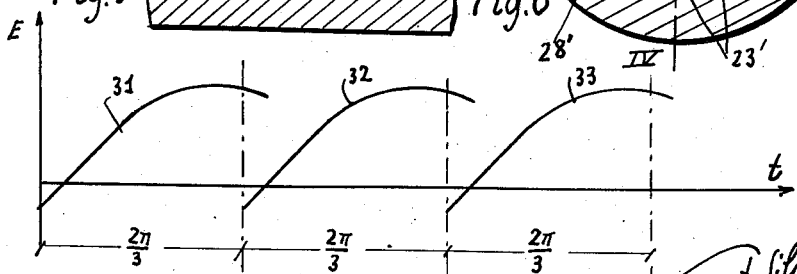
INVENTOR.
BY

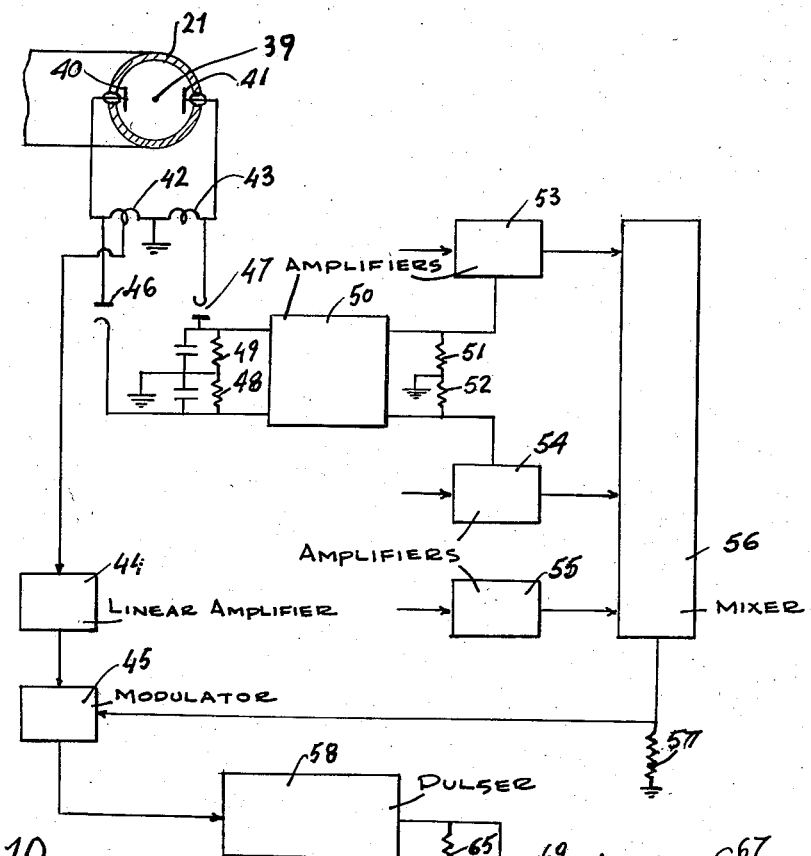
Fig. 10
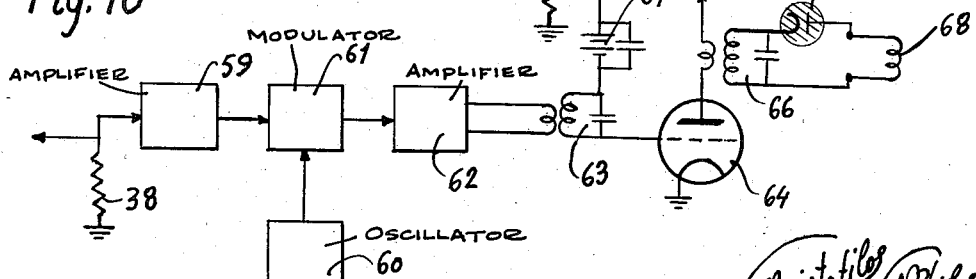

Aug. 4, 1959     NICHOLAS CHRISTOFILOS     2,898,456
ALSO KNOWN AS
NICHOLAS PHILOS
UNIVERSAL, CONSTANT FREQUENCY, PARTICLE ACCELERATOR
Filed June 9, 1953                                4 Sheets-Sheet 4

INVENTOR.

BY

United States Patent Office 2,898,456
Patented Aug. 4, 1959

2,898,456

UNIVERSAL, CONSTANT FREQUENCY, PARTICLE ACCELERATOR

Nicholas Christofilos, also known as Nicholas Philos, Washington, D. C.

Application June 9, 1953, Serial No. 360,576

6 Claims. (Cl. 250—27)

In the present apparatus the particles are accelerated by repeatedly crossing one or more accelerating gaps, while they are guided by a varying magnetic field, within an evacuated vessel on a circular orbit of almost constant radius.

The novelty of the present apparatus is that the frequency of the accelerating field is considerably lower than the frequency of revolution of the accelerated particles and is independent of their velocity. Therefore various types of particles including electrons can be accelerated, wtihout any change in the frequency of the electric accelerating field. Since this frequency remains constant during acceleration, and can be as low as 60 cycles per second, it is apparent that the circuit providing the power for the accelerating field can be simple and inexpensive.

The invention together with further objects and advantages thereof may best be understood by reference to the following description taken in connection with the accompanying drawings in which:

Fig. 5 is an elevation view of the straight sector where deflecting coils are placed.

Fig. 6 is a schematic representation of the particles' orbits when the deflecting coils are energized.

Fig. 7 is a cross-section of the guiding magnets taken on line II—II of Fig. 5.

Fig. 8 is a cross-section of the deflecting coils taken on line III—III of Fig. 5.

Fig. 9 is a cross-section of the evacuated vessel taken on line IV—IV of Fig. 8.

Fig. 10 is a schematic diagram of a time circuit used for energizing the deflecting coils. This circuit includes automatic correction of the shifting phase by means of a pickup signal from the accelerated bunch of particles.

Fig. 11 shows the variation of the intensity of the accelerating field during different phases of the timing cycle.

As illustrated by the accompanying drawings the apparatus embodying the present invention includes two or three circular guiding magnets and the associated evacuated vessels. The injection of charged particles into the accelerator of the present invention may be accomplished by conventional means such as is illustrated, for example, in U. S. Patent No. 2,599,188 to M. S. Livingston.

Figure 2:
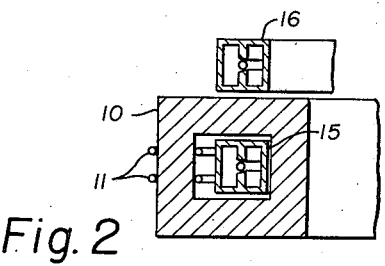
Fig. 2 is a cross-section of the apparatus taken on the line I—I of Fig. 1 for single phase operation.

Referring to Fig. 2, it is seen that for single phase operation the guiding magnet 15 is placed inside a transformer 10 which is excited by the coil 11 thereby producing an accelerating field along said guiding magnet 15.

As the guiding magnet short-circuits the applied electric field the particle acceleration takes place in gaps provided along the guiding magnet, the sectors of said guiding magnet acting as drift tubes.

The particles are accelerated during the first third of the cycle of the applied A.C. accelerating electric field. Thereafter they are transferred, by means of the deflecting coils 26', 27' (Figs. 8, 9) to the magnet 16, where they travel without acceleration during the remaining ⅔ of the cycle. Thereafter they are transferred back to the magnet 15 at the start of the next accelerating cycle. The intensity of the accelerating electric field is varied at a slightly higher rate than required by the rate of increase of the guiding magnetic field.

If the particles are accelerated more quickly than required by the variation of the intensity of the guiding magnetic field then the orbit radius increases. Therefore, by means of the device shown in Fig. 10 whose operation will be described hereafter, the particles are automatically shifted to the idling magnet 16 earlier in the accelerating cycle. They thereby remain in the accelerating magnet 15 less than one third of the cycle and consequently acquire less energy until their orbit radius decreases to the predetermined value. The reverse takes place if the particles acquire less energy during the accelerating part of the cycle than required by the rate of increase of the guiding magnetic field.

Figure 3:
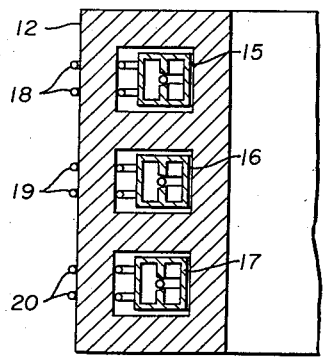
Fig. 3 is a cross-section of the apparatus taken on the line I—I of Fig. 1 for 3-phase operation.
Figure 4:
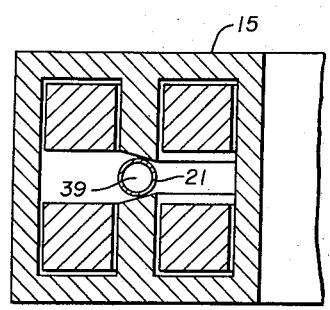
Fig. 4 is an enlarged cross-section of the magnet providing the guiding magnetic field.

In the case of 3-phase operation, 3-guiding magnets are necessary and the particles are accelerated in all three. In Fig. 3 are shown the 3 magnets 15, 16, 17 enclosed by a three phase transformer 12 and excited by the 3 coils 18, 19, 20 respectively. Along each of the 3 guiding magnets 15, 16, 17 an accelerating field is produced, each accelerating field being displaced 120° with respect to the others. That is, in Fig. 11 curve 31 represents the field variation along the magnet 15 curve 32 said variation along the magnet 16 and curve 33 the variation along the magnet 17. Obviously the guiding magnets act again as drift tubes; the acceleration taking place in suitable gaps provided along the guiding magnets. The acceleration of the particles is again automatically regulated by automatic phase shifting so that the particles are transferred from one magnet to another and, remain only 120° in each magnet. However, if the particles acquire more energy than required by the rate of increase of the guiding magnetic field, the accelerating third of each cycle is slightly shifted to the negative region, so that the particles remain in each magnet from, for example −5° to +115°, thus acquiring less energy. The frequency of the accelerating field can be very low, say 60 c.p.s., permitting the exciting coils 18, 19, 20 of Figure 3 to be directly connected to a conventional three phase power line.

As the particles may be transferred from one magnet to another several hundred times, in order to avoid, during their acceleration, an almost total loss, they must be bunched in a bunch considerably shorter then the length of each guiding magnet, said bunching being effected by accelerating the particles during such part of the cycle where the field is increasing. The effect of synchrotron phase oscillations is almost negligible because of the extremely small slope of the electric accelerating field due to the very low frequency of said field. Thus the dimensions of the bunch are substantially determined by the space charge and the magnitude of the focusing forces relative to the per unit length increase of the accelerating field along said bunch. Since the length of the bunch is a very small fraction of the wave-length of the accelerating field, the per unit length variation of this field is negligible and a very narrow bunch can be obtained. This permits the use of smaller apertures of the evacuated vessel and lower cost of the apparatus. This saving in cost is achieved even though three guiding magnets are required, as will be shown herein below.

Figure 1:
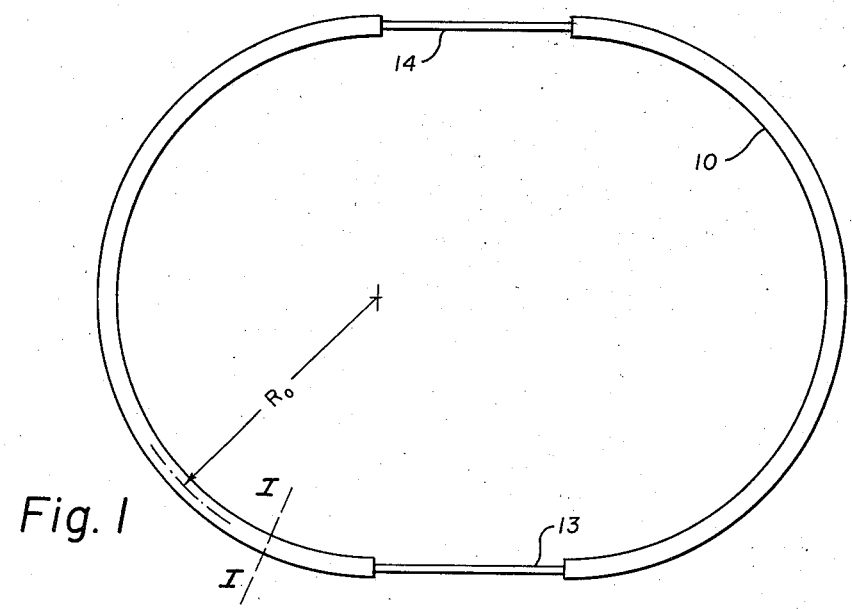
Fig. 1 is a plan-view of the apparatus where two semicircular sections and two straight sections are shown.

Referring to Fig. 1 it is seen that the accelerating transformer 12 is discontinued along the straight sectors. Also at a part of the straight sector 13, where the deflecting coils are placed, the guiding magnets are shifted by 90° to bring the evacuated vessels closer to each other. This can best be seen by comparing Figs. 3 and 7. For about half the length of said straight sectors the guiding magnets 15, 16 and 17 are also discontinued so that the particles move in a straight line in a common evacuated vessel 22 (Figs. 8, 9). Inside the walls 35 of said common vessel 22 groups of strong-focusing coils 23, 23' are embedded to provide the necessary focusing force as the particles move through the straight sectors. Inside the same walls which are constructed from a plastic insulating material, a second group of strong focusing coils 25, 25', 26, 26', 27, 27', 28, 28' of Figures 8 and 9 are also embedded and placed symmetrically around the orbits 29, 29', 30, 30' which the particles must follow as they shift from one magnet to another. These deflecting groups of coils are energized only when the particles must be transferred from one magnet to another, during only a fraction of the period of the particles' revolution, by the device shown in Fig. 10 and described hereafter. Said coils are energized by a pulsed current and the particles are deflected by a force produced by deviating from the ideal center symmetry orbit of the deflecting coils, said deviation being of the order of magnitude of about half millimeter, so that an error on the intensity of the current, energizing said deflecting coils of 20%, for example, causes a deviation from their orbit as they enter in the next magnet of about 1/10 of a millimeter which is negligible. In the other straight section 14 (Fig. 1) the guiding magnets are discontinued and only groups of strong-focusing coils, like the coils 23, 23' of Figures 8 and 9 are provided for focusing the particles as they move through said straight sector 14.

The timing device which energizes each group of deflecting coils is shown in Fig. 10. Inside the evacuated vessel 21 two electrodes 40 and 41 are placed to pick-up a signal from the revolving bunch of particles. Thus a high frequency E.M.F. is generated in the coils 42, 43 having a frequency equal to the frequency of revolution of the particles. The E.M.F. generated across the coil 42 is amplified by the linear amplifier 44 and the output of said amplifier is connected to the input of a modulator 45.

The voltages on the coils 42, 43 are equal if the particles' orbit coincides with the predetermined orbit 39. If the particles' energy is greater, than is needed, the radius of their orbit increases and the voltage induced in coil 43 is greater than in the coil 42. The opposite takes place if the particles' orbit radius decreases. The voltages, generated by the coils 42, 43 are rectified by the tubes 46, 47 and an E.M.F. of low frequency appears across the resistors 48, 49. Said voltages are amplified by the amplifier 50 which can be a conventional D.C. amplifier or a low frequency amplifier. Thus across the resistors, 51, 52, an E.M.F. appears linearly proportional to the E.M.F. across the coils 42, 43. This proportional E.M.F. is used to control the gain of two amplifiers 53, 54, so that a deviation of the particles' orbit from the orbit 39 increases the gain of one amplifier and decreases the gain of the other. Therefore the outputs of amplifiers 53, 54 are amplified low frequency E.M.F.'s which are applied to a mixer 56 in opposite phase. Accordingly if the voltages induced in the coils 42, 43 are equal, the super-position of the outputs of the amplifiers 53, 54 gives a zero E.M.F. in the mixer 56. To said mixer the output of a third amplifier 55 is also connected, said output being an E.M.F. of equal frequency to the output E.M.F. of the amplifiers 53, 54 but with a 90° phase shift. The frequency of said E.M.F.'s is equal to the frequency of the accelerating electric field. The phase of the output E.M.F. of the amplifier 55 should lag the phase of the accelerating field by 30°. The output of the mixer 56 is connected to a resistor 57 through a coil so devised that its core is saturated for most of the accelerating A.C. cycle with the result that across the resistor 57 an E.M.F. is generated with a very steep peak. By means of the group of amplifiers 50, 53, 54, 55 and the mixer 56 an output voltage is obtained across the resistor 57 having a fixed phase difference with respect of the accelerating field if the particles' orbit coincides with the orbit 39. For example, this fixed phase difference may be 25°. If the radius of the particles' orbit increases, the phase difference is decreased and if the particles' orbit decreases said phase difference increases. The E.M.F. across the resistor 57 is used to amplitude modulate the output of the amplifier 44 in the modulator 45. The output of modulator 45 is connected to the pulser 58. The modulated high frequency E.M.F. triggers the pulser 58 so that across the resistor 65 a pulse is generated, once every cycle of the accelerating field, of constant voltage, square-form with a width equal to the half-period of the H.F. cycle.

Across the resistor 38 an E.M.F. is produced linearly proportional to the current which excites the guiding magnetic field. Said E.M.F. is amplified by the amplifier 59 and thereafter is used to amplitude modulate, in the modulator 61 a U.H.F. E.M.F. generated in the oscillator 60. The modulated E.M.F., whose amplitude is almost proportional to the intensity of the magnetic field on the orbit 39, is thereafter amplified by the amplifier 62. The output of amplifier 62 is connected to the coil 63, which in turn is connected to the grid of the tube 64. The tube 64 is strongly biased by the D.C. source 69 so that it is cut off. When the pulsed E.M.F. is produced across the resistor 65 the tube conducts and operates as a class A amplifier. The output of amplifier tube 64 is coupled to the tuned circuit 66 which thereby produces a U.H.F. E.M.F. while the tube 64 is energized. The Q of the tuned circuit 66 must be very low, so that the E.M.F. across said tuned circuit is built up in a few cycles of the U.H.F. Thereafter the U.H.F. E.M.F. is rectified by the tube 67 and finally a pulsed E.M.F. is produced in the coil 68. The pulsed E.M.F. is transformed by a pulse transformer, coil 68 being the primary of said transformer and the secondary winding of said transformer being connected to the corresponding deflecting coil. By means of the above described device automatic correction of the phase at which the particles are shifted from one magnet to another is accomplished. In addition this device synchronizes the deflecting pulse with the phase of rotation of the particles, so that the deflecting field is built-up before the bunch of the particles approach the straight sector where the deflecting coils are placed. Obviously a device such as the one described above must be provided for each guiding magnet.

The injection of the particles in the apparatus is effected by means of the deflecting coils 25', 26' (Figs. 8 and 9) energized at the moment the intensity of the field on the orbit corresponds to the energy of the injected particles. As the energy of the particles inside the bunch is uniform, monoenergetic particles are injected. The duration of the injection lasts a fraction of the time of one revolution of the particles, so that the bunch is automatically formed from the very beginning of the acceleration.

The particles can be extracted from the apparatus at any desired moment of their acceleration course, provided that at the moment of their extraction they are circulating in the magnet 15. The energization of the deflecting coils 25, 26 to extract the particles is effected by means of a device similar to the device energizing the other deflecting coils and provided with an additional triggering circuit by means of which said coils are energized at any desired time, in synchronism of course, with the frequency revolution of the particles.

As can be concluded from the above description the device controlling the constancy of the orbit radius is independent of either the velocity or the kind of the accelerated particles. Thus any kind of ion as well as electrons can be accelerated without any change of any circuit, while the maximum energy the particles can acquire in the apparatus depend on the radius and the maximum intensity of the guiding magnetic field on the orbit.

As is mentioned above the dimensions of the bunch of particles depends on the slope of the accelerating field, the focusing forces, the enclosed charge, and also on the energy of the particles at their injection into the apparatus. If A is the azimuthal half-length of the bunch and B the radius of the cross-section at the middle (of said bunch) then $$B = A\sqrt{\frac{\Omega}{W} \cdot \frac{E_0 \cdot R}{\mu \cdot K \cdot U} \cdot \left[\frac{\sin \phi_2 - \sin \phi_1}{\phi_2 - \phi_1}\right]} \quad (1)$$

where R the orbit radius, U the injection energy in volts, $\phi$ $E_0$ the peak value of the accelerating field in volts/cm.

$$K = \frac{\delta H/H}{\delta R/R} \cdot \mu$$

the relative amplitude of the strong-focusing oscillations (pat. appl. Ser. No. 148,920, dated March 1950, now Patent Number 2,736,799) $w$ the rotation frequency of the particles at their injection $\Omega$ the rotation frequency of the accelerating field ($2\pi f$), and $\phi_1$, $\phi_2$ the initial and final phase, respectively, between which the acceleration takes place in each magnet. As can be concluded from Equation 1 for a given length of the bunch, the width of said bunch is proportional to the square root of the frequency of the accelerating electric field; thus a very low frequency of the accelerating field, such as 60 c.p.s. leads to a very narrow bunch, a smaller aperture of the evacuated vessel and consequently a lower cost.

The charge enclosed in the bunch is:

$$q = 7.5 \left(\frac{A}{R}\right)^3 \cdot \frac{\Omega}{w} \cdot \frac{E_0 R}{1-\beta^2} \cdot 10^{-7} \mu \text{ coul.} \quad (2)$$

Because of the negligible slope of the intensity of the accelerating electric field along the bunch, the problem of the, so called, transition point, where the phase oscillations change their mode of oscillation is automatically solved. This happens when $\mu K = 2(V/V_0)^2$ (see U.S. Patent No. 2,567,904, page 12) even though the phase oscillations are unstable, beyond the transition point. This results in only a small increase of the length of the bunch until the end of the acceleration.

In the above mentioned patent application on strong focusing, in order to avoid coupling between resonant harmonics of the free radial and vertical oscillations, it was proposed to vary continuously the ratio of said oscillations during accelerations. This ratio variation was accomplished by means of an auxiliary magnetic field.

Another way to avoid the results of resonances is to pass through said resonances very quickly so that the oscillations would not have the time to build-up, accordingly their amplitudes would not increase to any great extent. This can be effected as follows:

The azimuthal and radial variation of the intensity of the guidance magnetic field at the region of the equilibrium orbit is determined by the equation:

$$H = H_0 \left[1 - \left(1 - \frac{R}{R_0}\right) \cdot K \cdot \sin(n\theta)\right] \quad (3)$$

where $H_0$ is the intensity of the magnetic field at the orbit 39 (Fig. 10) of radius $R_0$, K the above mentioned number (the percentage increase of the field for a percentage increase of the radius), $n$ the number of strong-focusing wave-lengths along the orbit, $\theta$ the azimuthial angle and R the instantaneous radius.

As $n = 2\pi R/\lambda_0$ the equation can be written:

$$H = H_0 \left[1 - \left(1 - \frac{R}{R_0}\right) \cdot K \cdot \sin\left(\frac{2\pi R \theta}{\lambda_0}\right)\right] \quad (3a)$$

If now we make K or $\lambda_0$ a periodic function of $\theta$, by slightly varying them along the orbit, so that $$K = K_0(1 + \alpha \sin \theta) \quad (4)$$

or $$\lambda = \lambda_0(1 + \alpha \sin \theta) \quad (4a)$$

where $\alpha$ is a small numerical coefficient less than unity; it is seen that the frequencies of the free oscillations are are no longer constant but oscillate about a means value as the particles travel along their orbit. In other words the free oscillations are frequency modulated. The result of this frequency modulation is that if a resonance occurs the particles pass through the dangerous region very fast, remaining for only a small fraction of their rotation period, and the oscillation amplitude cannot build up.

Figure 12:
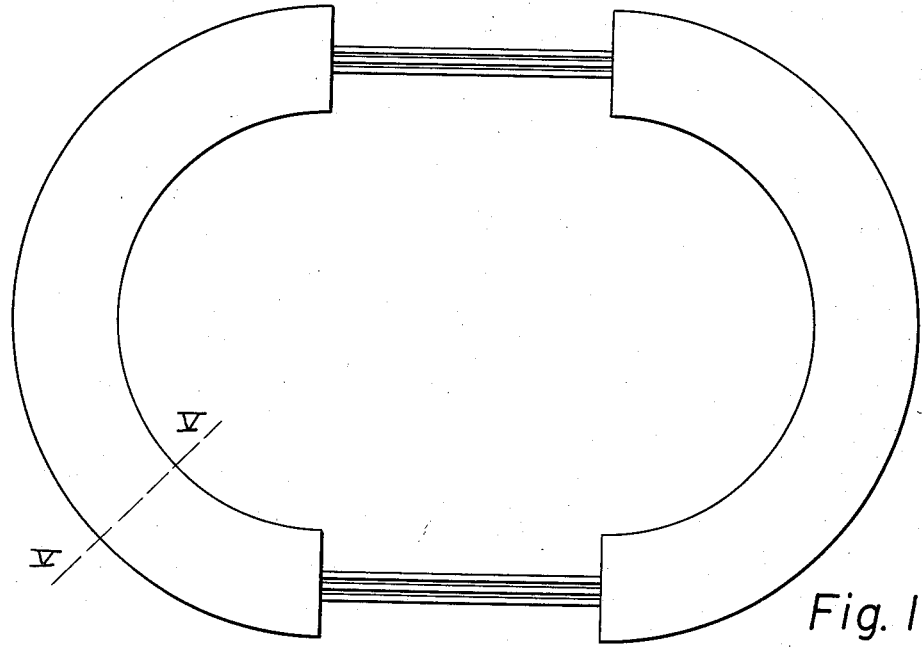
Fig. 12 is a plan view of a high voltage transformer accelerator provided with the "magnetic cable" described in the U.S. patent application Ser. No. 342,774, now abandoned.
Figure 13:
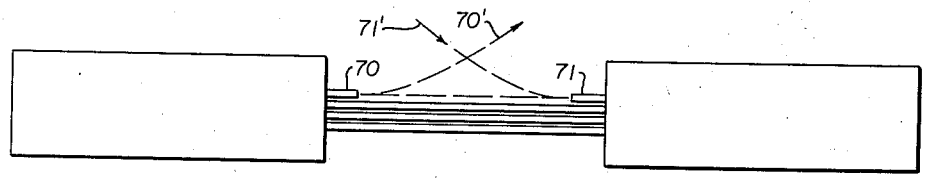
Fig. 13 is an elevation view of the transformer of Fig. 12 showing how the proposed method can be used on said transformer.

The present method of particle acceleration, can be applied to the magnetic cable transformer (pat. appl. Ser. No. 342,774, dated March 1953, now abandoned). In Figs. 12 and 13 are shown a plan view and elevation, respectively, of such a transformer. The two ends 70, 71 of the cable are so placed that the accelerated particles which emerge from the end 70 of the cable can enter the cable again by the other end 71. Therefore the particles can be repeatedly accelerated during the first third of the A.C. accelerating cycle. Thereafter they can be extracted from the transformer by means of suitable deflecting coils placed along the path 70' energized by a device as described above, injected to a second transformer accelerated for a third of the A.C. cycle etc.

Figure 14:
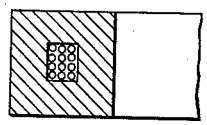
Fig. 14 is a cross-section of the transformer taken on line V—V of Fig. 12.
Figure 15:
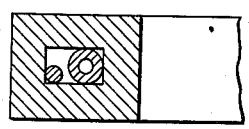
Fig. 15 is a cross-section of the transformer taken on line V—V of Fig. 12 wherein only one loop of magnetic cable is used.

The transformer magnetic cable coil can be fabricated from many turns (Fig. 14), or from a single turn (Fig. 15).

Figure 16:
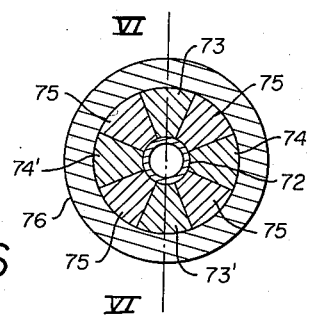
Fig. 16 is a cross-section of an improved type of magnetic cable for high energy particles.

To accelerate particles to higher energies a different type of magnetic cable can be used. One such cable is shown in cross-section in Fig. 16. Around a tube 72 of non-magnetic material 4 sectors 73, 73', 74, 74', constructed from a permanent magnet material are placed. Alternately spaced between these magnetic sectors are 4 sectors 75 of non magnetic material. The 4 magnetic sectors are magnetized in such way that inside the evacuated tube 72 the magnetic lines emerge from the sectors 73, 73' and enter in the sectors 74, 74'. The ring 76 is constructed from a magnetic material to close the magnetic circuit.

The symmetry planes of the magnetic planes are twisted along the tube 72 so that the trace of the axis VI—VI with the ring 76 is a helix, the pitch of said helix being equal to 2 strong-focusing wavelengths.

The proposed new type of magnetic cable is, of course, more expensive than the types described in the above mentioned U.S. patent application No. 342,774, now abandoned, but several times higher particle energies can be obtained with the same radius. An easier construction of the proposed type of cable is to magnetize only the ring 76 while the magnetic sectors 73, 73', 74, 74', would be provided in this case from a non-permanent magnetic material serving as pole pieces only.

While the invention has been described by reference to particular embodiments it will be understood that numerous modifications may be made by those skilled in the art without actually departing from the invention; therefore, the appended claims are designed to cover all such equivalent variations as come within the true spirit and scope of the foregoing disclosure.

What I claim as new and desire to secure by Letters Patent of the United States is:

1. A universal constant frequency particle accelerator which comprises in combination at least a first and a second evacuated annular chamber, each of said chambers at least partially overlapping one another, means for establishing a strong focusing magnetic field in each of said chambers over the entire length thereof, the lines of flux of said magnetic field being perpendicular to the axis of said chambers, a transformer for establishing a constant frequency electric accelerating field in at least the first said chamber, said electric field being parallel to the axis of said chamber, whereby particles injected into said first chamber are accelerated for a first acceleration period less than one-half cycle of the constant frequency accelerating field, means responsive to a signal from the particles for controlling the orbit radius of said particles constant independent of either the velocity or kind of particles, deflecting coils surrounding each of said chambers for a portion of its length, the deflecting coils surrounding said first chamber being energized to deflect said particles into said second chamber at the end of said first acceleration period, the deflection coils of said second chamber being energized to deflect said particles back into said first chamber at the start of the second acceleration period and means for synchronizing the energization of said deflecting coils with the start and end of the acceleration periods.

2. A universal constant frequency particle accelerator which comprises in combination at least a first, a second and a third evacuated annular chamber, each of said chambers at least partially overlapping the other, means for establishing a strong focusing magnetic field in each of said chambers, the lines of flux of said magnetic field being perpendicular to the axis of said chambers, a transformer for establishing a constant frequency electric accelerating field in the three said chambers, said electric field being parallel to the axis of said chambers, whereby particles injected into the first said evacuated chamber are accelerated for a first acceleration period less than one-half cycle of the constant frequency accelerating field, means responsive to a signal from the particles for controlling the orbit radius of said particles constant independent of either the velocity or kind of particles, deflecting coils surrounding each of said chambers for a portion of its length, the deflecting coils of said first chamber being energized at the end of said first acceleration period, thereby transferring said particles into said second evacuated chamber, the deflecting coils of said second chamber being energized at the end of said second acceleration period, thereby transferring said particles into said third evacuated chamber, the deflecting coils of said third chamber being energized at the end of the third acceleration period and means for synchronizing the time of energization of the deflecting coils.

3. A universal constant frequency particle accelerator which comprises, in combination, at least a first and second evacuated annular chamber, each of said chambers at least partially overlapping one another, means for establishing a strong-focusing magnetic field in each of said chambers, said means including a tubular member which encloses said orbit and which is permanently magnetized in such a manner that the azimuthal component with respect to said orbit of the magnetic flux density therein increases in magnitude with increasing distance from said orbit and is a periodic function of azimuthal position with respect to said orbit, at least four poles affixed to said tubular member for providing said magnetic flux density, the lines of flux of said magnetic field being perpendicular to the axis of said chambers, a transformer for establishing a constant frequency electric accelerating field in at least the first said chamber, said electric field being parallel to the axis of said chamber, whereby particles injected into said first chamber are accelerated for a first acceleration period less than one-half cycle of the constant frequency accelerating field, means responsive to a signal from the particle for controlling the orbit radius of said particles constant independent of either the velocity or kind of particles, deflecting coils surrounding each of said chambers for a portion of its length, the deflecting coils surrounding said first chamber being energized to deflect said particles into said second chamber at the end of said first acceleration period, the deflection coils of said second chamber being energized to deflect said particles back into said first chamber at the start of the second acceleration period and means for synchronizing the energization of said deflecting coils with the start and end of the acceleration periods.

4. Apparatus for the guidance of charged particles along a predetermined orbit comprising a non-magnetic tube defining a particle orbit, a magnetic cylinder disposed about said tube in coaxial relationship thereto, four magnets disposed longitudinally of said tube in opposite quadrants thereabout within said cylinder and extending between said tube and cylinder, and four non-magnetic elements disposed longitudinally of said tube alternately with said magnets about the circumference of said tube with said magnets disposed to present alternate magnet poles about the circumference of said tube.

5. A universal constant frequency particle accelerator comprising means defining a plurality of annular evacuated chambers contiguously disposed in off-set overlapping relation through at least one common chamber, magnetic means establishing strong focusing magnetic guiding fieldings through said chambers for constraining charged particles traversing same to orbit therein, transformer means about at least a part of each of said annular chambers for establishing particle accelerating fields therein of periodically varying amplitude, magnetic deflecting coils about said common chamber and establishing skew magnetic fields therein for deflecting particles from one annular chamber to another, and control means for said deflection coils including particle detection means energizing said deflection coils upon a predetermined increase in the radius of particle orbit in an anular chamber.

6. A electronic control circuit for a multiple orbit charged particle accelerator having deflecting coils for transferring particles from one orbit to another and means generating a charged particle accelerating field, comprising pick-up means producing a pair of signals of a frequency proportional to the orbit rotational frequency of charged particles in said accelerator and having relative amplitudes proportional to the deviation of charged particles from a predetermined orbital radius, a mixer combining the aforesaid signals with a further signal of the same frequency as said accelerating field in lagging phase relationship thereto for producing a signal having a phase difference from the accelerating field frequency proportional to the variation of particle orbit from a predetermined trajectory, means modulating a signal from said pick-up means with the output of said mixer for producing a voltage pulse, means combining a signal derived from the accelerating field with said voltage pulse for controlling operation of a discharge tube and energizing said deflection coils in accordance with the ouptut of said discharge tube whereby charged particles are deflected between orbits in said accelerator in accordance with the radius of the particle trajectory in any particular orbit.

References Cited in the file of this patent

UNITED STATES PATENTS

| | | |
|---|---|---|
| 2,473,477 | Smith | June 14, 1949 |
| 2,503,173 | Reisner | Apr. 4, 1950 |
| 2,520,813 | Rudenberg | Aug. 29, 1950 |
| 2,567,904 | Christofilos | Sept. 11, 1951 |
| 2,580,606 | Schiel et al. | Jan. 1, 1952 |
| 2,599,188 | Livingston | June 3, 1952 |
| 2,658,999 | Farly | Nov. 10, 1953 |
| 2,698,384 | Wideroe | Dec. 28, 1954 |